United States Patent
Nakano

(10) Patent No.: US 8,962,776 B2
(45) Date of Patent: Feb. 24, 2015

(54) ETHYLENE-α-OLEFIN-NONCONJUGATED POLYENE COPOLYMER

(71) Applicant: Sumitomo Chemical Company, Limited, Tokyo (JP)

(72) Inventor: Sadayuki Nakano, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/363,352

(22) PCT Filed: Dec. 18, 2012

(86) PCT No.: PCT/JP2012/083375
§ 371 (c)(1),
(2) Date: Jun. 6, 2014

(87) PCT Pub. No.: WO2013/094767
PCT Pub. Date: Jun. 27, 2013

(65) Prior Publication Data
US 2014/0316091 A1 Oct. 23, 2014

(30) Foreign Application Priority Data
Dec. 21, 2011 (JP) ................................. 2011-279373

(51) Int. Cl.
*C08F 210/18* (2006.01)
*C08F 210/06* (2006.01)
*C08F 236/20* (2006.01)
*C08F 4/68* (2006.01)

(52) U.S. Cl.
CPC ............. *C08F 210/06* (2013.01); *C08F 210/18* (2013.01); *Y10S 526/905* (2013.01)
USPC ........ 526/282; 526/169.2; 526/336; 526/905; 524/554

(58) Field of Classification Search
USPC ................ 526/169.2, 282, 336, 905; 524/554
See application file for complete search history.

(56) References Cited

U.S. PATENT DOCUMENTS

| 3,896,096 | A | 7/1975 | Visser et al. | |
|---|---|---|---|---|
| 6,465,584 | B1 | 10/2002 | Evens et al. | |
| 7,005,492 | B2 * | 2/2006 | Sassa | 526/336 |
| 8,426,522 | B2 * | 4/2013 | Nakano | 525/191 |

FOREIGN PATENT DOCUMENTS

| EP | 202060 A1 | 11/1986 |
|---|---|---|
| JP | S50-129690 A | 10/1975 |
| JP | S61-261306 A | 11/1986 |
| JP | 2002-507228 A | 3/2002 |
| JP | 2002-249623 A | 9/2002 |
| JP | 2004-285324 A | 10/2004 |
| JP | 2011-174002 A | 9/2011 |

OTHER PUBLICATIONS

Int'l Search Report issued Mar. 12, 2013 in Int'l Application No. PCT/JP2012/083375.

* cited by examiner

*Primary Examiner* — Fred M Teskin
(74) *Attorney, Agent, or Firm* — Panitch Schwarze Belisario & Nadel LLP

(57) ABSTRACT

Provided is an ethylene-α-olefin-nonconjugated polyene copolymer having ethylene units, α-olefin units and nonconjugated polyene units, wherein the copolymer satisfies the following requirements: (A): the intrinsic viscosity [η] is 0.5 to 1.8 dl/g, (B): the content of ethylene units is 50 to 90 mol % and the content of α-olefin units is 50 to 10 mol % where the sum total of the contents of ethylene units and α-olefin units is taken as 100 mol %, (C): the iodine value is 1 to 50, (D): the ratio of tan δ taken at 100° C. and 2 cpm to tan δ taken at 100° C. and 1000 cpm is from 1.0 to 1.7, and (E): the ratio of the Z-average molecular weight to the number average molecular weight is from 15 to 25 and the weight average molecular weight to the number average molecular weight is from 3 to 5.

2 Claims, No Drawings

ETHYLENE-α-OLEFIN-NONCONJUGATED POLYENE COPOLYMER

CROSS-REFERENCE TO RELATED APPLICATION

This application is a Section 371 of International Application No. PCT/JP2012/083375, filed Dec. 18, 2012, which was published in the Japanese language on Jun. 27, 2013, under International Publication No. WO 2013/094767 A1, and the disclosure of which is incorporated herein by reference.

TECHNICAL FIELD

The present invention relates to an ethylene-α-olefin-nonconjugated polyene copolymer.

BACKGROUND ART

Various types of rubber hoses such as a radiator hose, a drain hose for radiator overflow, a heater hose for indoor heating, an air-conditioner drain hose, a wiper water supply hose, a roof drain hose and a protective hose, for cooling engines are mounted to cars, motorcycles, industrial machines, construction machines, agricultural machines, etc. As a base rubber to be used for a rubber hose, an ethylene-α-olefin-nonconjugated polyene copolymer is disclosed in, for example, JP-A-2004-285324 and JP-A-2011-174002.

DISCLOSURE OF THE INVENTION

However, any conventional ethylene-α-olefin-nonconjugated polyene copolymer does not fully satisfy both roll kneading processability in preparing a polymer composition by roll kneading the polymer and auxiliary ingredients and extrusion processability in extrusion forming the polymer composition into a formed article such as a hose.

Under such a situation, the problem to be solved by the present invention is to provide an ethylene-α-olefin-nonconjugated polyene copolymer excellent in roll kneading processability and extrusion processability.

Means for Solving the Problems

The present invention relates to an ethylene-α-olefin-nonconjugated polyene copolymer comprising ethylene units, α-olefin units and nonconjugated polyene units, wherein the copolymer satisfies the following requirements (A), (B), (C), (D) and (E), (A): the intrinsic viscosity [η] is 0.5 to 1.8 dl/g, (B): the content of the ethylene units is 50 to 90 mol % and the content of the α-olefin units is 50 to 10 mol % where the sum total of the content of the ethylene units and the content of the α-olefin units is taken as 100 mol %, (C): the iodine value is 1 to 50, (D): the ratio of tan δ taken at 100° C. and 2 cpm to tan δ taken at 100° C. and 1000 cpm is from 1.0 to 1.7, (E): the ratio of the Z-average molecular weight to the number average molecular weight is from 15 to 25 and the weight average molecular weight to the number average molecular weight is from 3 to 5.

MODE FOR CARRYING OUT THE INVENTION

The present invention relates to an ethylene-α-olefin-nonconjugated polyene copolymer comprising ethylene units, α-olefin units and nonconjugated polyene units. In the present invention, the term "name of monomer+unit" like "ethylene unit," "α-olefin unit" and "nonconjugated polyene unit" means a "monomer unit based on the monomer."

Preferred as the α-olefin of the ethylene-α-olefin-nonconjugated polyene copolymer are α-olefins having 3 to 20 carbon atoms, examples of which include linear α-olefins such as propylene, 1-butene, 1-pentene, 1-hexene, 1-heptene, 1-octene, 1-nonene and 1-decene; and branched α-olefins such as 3-methyl-1-butene, 3-methyl-1-pentene and 4-methyl-1-pentene. These are used singly or in combination.

Preferred as the α-olefin are propylene and 1-butene, and propylene is more preferred.

Examples of the nonconjugated polyene of the ethylene-α-olefin-nonconjugated polyene copolymer include linear nonconjugated dienes such as 1,4-hexadiene, 1,6-octadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetraindene, 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene, 5-(7-octenyl)-2-norbornene, 5-methylidene-2-norbornene, 5-ethylidene-2-norbornene, 5-propylidene-2-norbornene, 5-butylidene-2-norbornene and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene, 1,4,9-decatriene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 8,14,16-trimethyl-1,7,14-hexadecatriene and 4-ethylidene-12-methyl-1,11-pentadecadiene. These are used singly or in combination. Preferred as the nonconjugated polyene are 5-alkylidene-2-norbornenes such as 5-methylidene-2-norbornene, 5-ethylidene-2-norbornene, 5-propylidene-2-norbornene and 5-butylidene-2-norbornene; and 5-alkenyl-2-norbornenes such as 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(5-heptenyl)-2-norbornene and 5-(7-octenyl)-2-norbornene, and 5-alkylidene-2-norbornenes are more preferred.

Preferred as the ethylene-α-olefin-nonconjugated polyene copolymer are copolymers in which the α-olefin is propylene and the nonconjugated polyene is at least one compound selected from the compound group consisting of 5-alkylidene-2-norbornenes and 5-alkenyl-2-norbornenes.

Examples of the ethylene-α-olefin-nonconjugated polyene copolymer include an ethylene-propylene-5-ethylidene-2-norbornene copolymer, an ethylene-propylene-dicyclopentadiene copolymer, an ethylene-propylene-5-vinyl-2-norbornene copolymer, an ethylene-1-butene 5-ethylidene-2-norbornene copolymer, an ethylene-1-butene-dicyclopentadiene copolymer and an ethylene-1-butene-5-vinyl-2-norbornene copolymer.

The intrinsic viscosity [η] of the ethylene-α-olefin-nonconjugated polyene copolymer is 0.5 dl/g to 1.8 dl/g. In order to improve roll kneading processability, the intrinsic viscosity [η] is preferably 1.0 dl/g or more, more preferably 1.3 dl/g or more, even more preferably 1.4 dl/g or more. On the other hand, in order to improve extrusion processability, the intrinsic viscosity [η] is preferably 1.7 dl/g or less. The intrinsic viscosity [η] is measured at 135° C. in Tetralin.

The content of monomer units based on ethylene (i.e., ethylene units) of the ethylene-α-olefin-nonconjugated polyene copolymer is 50 mol % to 90 mol % and the content of monomer units based on the α-olefin (i.e., α-olefin units) is 10 mol % to 50 mol %. In order to improve roll kneading processability, it is preferred that the content of ethylene units be 55 mol % or more and the content of α-olefin units be 45 mol % or less, it is more preferred that the content of ethylene units be 58 mol % or more and the content of α-olefin units be 42 mol % or less, and it is even more preferred that the content of ethylene units be 60 mol % or more and the content of α-olefin units be 40 mol % or less. In order to improve extrusion processability, it is preferred that the content of ethylene units is 80 mol % or less and the content of α-olefin units is 20 mol % or more, it is more preferred that the content of ethylene units is 75 mol % or less and the content of α-olefin units is 25 mol % or more, and it is even more preferred that the content of ethylene units is 70 mol % or less and the content of α-olefin units is 30 mol % or more. The sum total of the content of ethylene units and the content of α-olefin units is taken as 100 mol %. The content of ethylene units and the content of α-olefin units are measured by infrared spectrophotometry.

The iodine value (unit: g/100 g-polymer) of the ethylene-α-olefin-nonconjugated polyene copolymer is 1 to 50. In order to improve roll kneading processability, the iodine value is preferably 5 or more, more preferably 10 or more, even more preferably 12 or more. On the other hand, in order to improve extrusion processability, the iodine value is preferably 40 or less, more preferably 35 or less, even more preferably 30 or less.

The ratio of tan δ taken at 100° C. and 2 cpm to tan δ taken at 100° C. and 1000 cpm of the ethylene-α-olefin-nonconjugated polyene copolymer, i.e., tan δ (100° C., 2 cpm)/tan δ (100° C., 1000 cpm), is from 1.0 to 1.7. In order to improve extrusion processability, the ratio is preferably 1.6 or less, more preferably 1.5 or less. tan δ as used herein is the ratio of the shear loss modulus to the shear storage modulus (shear loss modulus/shear storage modulus) and is measured at a temperature of 100° C. and a strain of 13.95% with a viscoelasticity measuring apparatus.

The ratio of the Z-average molecular weight (Mz) to the number average molecular weight (Mn) of the ethylene-α-olefin-nonconjugated polyene copolymer, i.e., Mz/Mn, is from 15 to 25. In order to improve roll kneading processability, Mz/Mn is preferably 17 or more, and in order to improve extrusion processability, Mz/Mn is preferably 22 or less. The Z-average molecular weight (Mz) and the number average molecular weight (Mn) are measured by gel permeation chromatography (GPC).

The ratio of the weight average molecular weight (Mw) to the number average molecular weight (Mn) of the ethylene-α-olefin-nonconjugated polyene copolymer, i.e., Mw/Mn, is from 3 to 5. In order to improve roll kneading processability, Mw/Mn is preferably 4 or more. The weight average molecular weight (Mw) and the number average molecular weight (Mn) are measured by gel permeation chromatography (GPC).

The method for producing the ethylene-α-olefin-nonconjugated polyene copolymer of the present invention may be a method of copolymerizing ethylene, an α-olefin and a nonconjugated polyene under polymerization condition that satisfies the following conditions (a), (b) and (c) in a hydrocarbon compound solvent using a polymerization catalyst prepared using a vanadium compound and an organoaluminum compound as polymerization catalyst components.

(a) The molar ratio of the use amount of the organoaluminum compound to the use amount of the vanadium compound [(the number of moles of the organoaluminum compound)/(the number of moles of the vanadium compound)] is from 0.1 to 2.0.

(b) The polymerization temperature is 50 to 80° C.

(c) The amount of the hydrogen to be fed to a polymerization reactor is 0.001 to 0.1 NL per 1 kg of the solvent to be fed to the polymerization reactor.

(d) The amount of the vanadium compound to be fed to the polymerization reactor is 0.02 to 0.2 parts by weight per 100 parts by weight of the solvent to be fed to the polymerization reactor.

Examples of the vanadium compound to be used in the above-described production method include compounds represented by $VO(OR)_m Cl_n$ wherein R represents an alkyl group having 1 to 10 carbon atoms, m and n are numbers which satisfy m+n=3, 0≤m<3, and 0<n≤3, such as $VOCl_3$, $VO(OCH_3)_{0.5}Cl_{2.5}$, $VO(OC_2H_5)_{0.5}Cl_{2.5}$, $VO(O(n-C_3H_7))_{0.5}Cl_{2.5}$, $VO(O(n-C_4H_9))_{0.5}Cl_{2.5}$, $VO(O(n-C_5H_{11}))_{0.5}Cl_{2.5}$, $VO(O(n-C_6H_{13}))_{0.5}Cl_{2.5}$, $VO(O(n-C_7H_{15}))_{0.5}Cl_{2.5}$, $VO(O(n-C_8H_{17}))_{0.5}Cl_{2.5}$, $VO(OCH_3)_{0.8}Cl_{2.2}$, $VO(OC_2H_5)_{0.8}Cl_{2.2}$, $VO(O(n-C_3H_7))_{0.8}Cl_{2.2}$, $VO(O(n-C_4H_9))_{0.8}Cl_{2.2}$, $VO(O(n-C_5H_{11}))_{0.8}Cl_{2.2}$, $VO(O(n-C_6H_{13}))_{0.8}Cl_{2.2}$, $VO(O(n-C_7H_{15}))_{0.8}Cl_{2.2}$, $VO(O(n-CH_{17}))_{0.8}Cl_{2.2}$, $VO(OCH_3)Cl_2$, $VO(OC_2H_5)Cl_2$, $VO(O(n-C_3H_7))Cl_2$, $VO(O(n-C_4H_9))Cl_2$, $VO(O(n-C_5H_{11}))Cl_2$, $VO(O(n-C_6H_{13}))Cl_2$, $VO(O(n-C_7H_{15}))Cl_2$, $VO(O(n-CH_{17}))Cl_2$, $VO(OCH_3)_{1.5}Cl_{0.5}$, $VO(OC_2H_5)_{1.5}Cl_{0.5}$, $VO(O(n-C_3H_7))_{1.5}Cl_{0.5}$, $VO(O(n-C_4H))_{1.5}Cl_{0.5}$, $VO(O(n-C_5H_{11})_{1.5}Cl_{0.5}$, $VO(O(n-C_6H_{13}))_{1.5}Cl_{0.5}$, $VO(O(n-C_7H_{15}))_{1.5}Cl_{0.5}$, and $VO(O(n-CH_{17}))_{1.5}Cl_{0.5}$. Preferred are compounds represented by $VO(OC_2H_5)_r Cl_s$, wherein r and s are numbers which satisfy r+s=3, 1≤r<3, and 0<s≤2, such as $VOCl_3$, $VO(OC_2H_5)_{0.5}Cl_{2.5}$, $VO(OC_2H_5)_{0.8}Cl_{2.2}$, $VO(OC_2H_5)Cl_2$, and $VO(OC_2H_5)_{1.5}Cl_{0.5}$, and more preferred is $VOCl_3$.

Examples of the organoaluminum compound to be used in the above-described production method include compounds represented by $R_t AlCl_u$, wherein R represents an alkyl group having 1 to 10 carbon atoms, and t and u are numbers which satisfy t+u=3, 0<t≤3, and 0≤u<3, such as $(C_2H_5)_2AlCl$, $(n-C_4H_9)_2AlCl$, $(iso-C_4H_9)_2AlCl$, $(n-C_6H_{13})_2AlCl$, $(C_2H_5)_{1.5}AlCl_{1.5}$, $(n-C_4H_9)_{1.5}AlCl_{1.5}$, $(iso-C_4H_9)_{1.5}AlCl_{1.5}$, $(n-C_6H_{13})_{1.5}AlCl_{1.5}$, $C_2H_5AlCl_2$, $(n-C_4H_9)AlCl_2$, $(iso-C_4H_9)AlCl_2$, and $(n-C_6H_{13})AlCl_2$. Preferred are compounds represented by $R_x AlCl_y$, wherein R represents an alkyl group having 2 to 6 carbon atoms, and x and y are numbers which satisfy x+y=3, 1≤x≤2, and 1≤y≤2, and more preferred are $(C_2H_5)_2AlCl$ and $(C_2H_5)_{1.5}AlCl_{1.5}$.

Preferred as the polymerization catalyst is a catalyst obtained by bringing a vanadium compound and an organoaluminum compound into contact with each other in the absence of alcohol.

Examples of the hydrocarbon compound to be used as the solvent include aliphatic hydrocarbon compounds such as propane, butane, isobutane, pentane, hexane, heptane and octane; and alicyclic hydrocarbon compounds, such as cyclopentane and cyclohexane.

The molar ratio of the use amount of the organoaluminum compound to the use amount of the vanadium compound [(the number of moles of the organoaluminum compound)/(the number of moles of the vanadium compound)] is preferably from 0.1 to 2.0, more preferably from 0.5 to 1.8, even more preferably from 0.8 to 1.7. To make tan δ (100° C., 2 cpm)/tan δ (100° C., 1000 cpm) smaller or to make the intrinsic viscosity [η] smaller, it is preferred to make the molar ratio smaller. On the other hand, to make Mz/Mn and Mw/Mn larger, it is preferred to make the molar ratio smaller.

The polymerization temperature is preferably 50 to 80° C., more preferably 55 to 60° C. To make tan δ (100° C., 2 cpm)/tan δ (100° C., 1000 cpm) smaller or to make Mz/Mn and Mw/Mn larger, it is preferred to make the polymerization temperature higher.

The polymerization pressure is usually 0.1 to 10 MPa, preferably 0.1 to 5 MPa, more preferably 0.1 to 3 MPa.

The amount of the hydrogen to be fed to the polymerization reactor is preferably 0.001 to 0.1 NL, more preferably 0.005 to 0.05 NL, even more preferably 0.01 to 0.04 NL per 1 kg of the solvent to be fed to the polymerization reactor. To make Mz/Mn larger or to make the intrinsic viscosity [η] larger, it is preferred to make the feed amount of the hydrogen larger.

The amount of the vanadium compound to be fed to the polymerization reactor is preferably 0.02 to 0.2 parts by weight, more preferably 0.03 to 0.1 parts by weight per 100 parts by weight of the solvent to be fed to the polymerization reactor. To make the intrinsic viscosity [η] larger or to make tan δ (100° C., 2 cpm)/tan δ (100° C., 1000 cpm) larger, it is preferred to make the amount of the vanadium compound larger.

The ethylene-α-olefin-nonconjugated polyene copolymer of the present invention is suitably used as a material for vulcanized rubber.

The method for preparing vulcanized rubber may be a method that comprises incorporating, as necessary, additives and/or a resin to an ethylene-α-olefin-nonconjugated polyene copolymer, followed by vulcanizing treatment by heating, electron beam irradiation, or the like.

Examples of the above-mentioned additives include a vulcanizing agent, a vulcanization aid, a vulcanization accelerator, a softening agent, a reinforcing agent, a foaming agent, a foaming aid, a stabilizer and a defoaming agent.

Sulfur, sulfur-containing compounds, organic peroxides, and so on can be used as the vulcanizing agent. Powder sulfur, precipitated sulfur, colloidal sulfur, surface-treated sulfur, insoluble sulfur, etc. can be used as the sulfur. The use amount of sulfur and a sulfur-containing compound is preferably 0.01 to 10 parts by weight, more preferably 0.1 to 5 parts by weight where the amount of the ethylene-α-olefin-nonconjugated polyene copolymer is taken as 100 parts by weight.

Examples of the organic peroxide include dicumyl peroxide, 2,5-dimethyl-2,5-di(tert-butylperoxy)hexane, 2,5-dimethyl-2,5-di(benzoylperoxy)hexane, 2,5-dimethyl-2,5-(tert-butylperoxy)hexyne-3, di-tert-butylperoxide, di-tert-butylperoxide-3,3,5-trimethylcyclohexane and tert-butylhydroperoxide. Preferred are dicumyl peroxide, di-tert-butylperoxide and di-tert-butylperoxide-3,3,5-trimethylcyclohexane, and more preferred is di-tert-butylperoxide-3,3,5-trimethylcyclohexane. The use amount of the organic peroxide is preferably 0.1 to 15 parts by weight, more preferably 1 to 8 parts by weight where the amount of the ethylene-α-olefin-nonconjugated polyene copolymer is taken as 100 parts by weight.

Examples of the vulcanization aid to be used together with sulfur or a sulfur compound include metal oxides such as magnesium oxide and zinc oxide. Zinc oxide is preferred. The loading of such a vulcanization aid is preferably 1 to 20 parts by weight where the amount of the ethylene-α-olefin-nonconjugated polyene copolymer is taken as 100 parts by weight.

Examples of the vulcanization aid to be used together with the organic peroxide include triallyl isocyanurate, N,N'-m-phenylenebismaleimide, methacrylic acid, methyl methacrylate, ethyl methacrylate, propyl methacrylate, isopropyl methacrylate, n-butyl methacrylate, i-butyl methacrylate, sec-butyl methacrylate, t-butyl methacrylate, 2-ethylhexyl methacrylate, cyclohexyl methacrylate, isodecyl methacrylate, lauryl methacrylate, tridecyl methacrylate, stearyl methacrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, benzyl methacrylate, dimethylaminoethyl methacrylate, diethylaminoethyl methacrylate, methacryloxyethyl phosphate, 1,4-butanediol diacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol dimethacrylate, dipropylene glycol dimethacrylate, polypropylene glycol dimethacrylate, trimethyloletane trimethacrylate, trimethylolpropane trimethacrylate, allyl glycidyl ether, N-methylolmethacrylamide, 2,2-bis(4-methacryloxypolyethoxyphenyl)propane, aluminum methacrylate, zinc methacrylate, calcium methacrylate, magnesium methacrylate, and 3-chloro-2-hydroxypropyl methacrylate. The loading of such a vulcanization aid is preferably 0.05 to 15 parts by weight, more preferably 0.1 to 8 parts by weight where the amount of the ethylene-α-olefin-nonconjugated polyene copolymer is taken as 100 parts by weight.

Examples of the vulcanization accelerator include tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, N,N'-dimethyl-N,N'-diphenylthiuram disulfide, N,N'-dioctadecyl-N,N'-diisopropylthiuram disulfide, N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, dibenzothiazyl disulfide, diphenylguanidine, triphenylguanidine, diorthotolylguanidine, orthotolyl-bi-guanide, diphenylguanidine-phthalate, acetaldehyde-aniline reaction products, butyl aldehyde-aniline condensates, hexamethylenetetramine, acetaldehyde ammonia, 2-mercaptoimidazoline, thiocarbanilide, diethylthiourea, dibutylthiourea, trimethylthiourea, diorthotolylthiourea, zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthogenate and ethylene thiourea. The loading of the vulcanization accelerator is preferably 0.05 to 20 parts by weight, more preferably 0.1 to 8 parts by weight where the amount of the ethylene-α-olefin-nonconjugated polyene copolymer is taken as 100 parts by weight.

Examples of the softening agent include petrolic softeners such as process oil, lubricating oil, paraffin, liquid paraffin, petroleum asphalt and Vaseline; coal tar-based softeners such as coal tar and coal tar pitch; fatty oil softeners such as castor oil, linseed oil, rapeseed oil and coconut oil; waxes such as tall oil, factice, beeswax, carnauba wax and lanolin; fatty acids and fatty acid salts such as ricinoleic acid, palmitic acid, barium stearate, calcium stearate and zinc laurate; and synthetic polymer substances such as petroleum resin, atactic polypropylene and cumarone indene resin. The loading of the softening agent is preferably 1 to 300 parts by weight, more preferably 20 to 250 parts by weight, even more preferably 50 to 200 parts by weight, where the amount of the ethylene-α-olefin-nonconjugated polyene copolymer is taken as 100 parts by weight.

Examples of the reinforcing agent include carbon black, silica, calcium carbonate, finely powdered talc and finely powdered aluminum silicate. Examples of carbon black include SRF, GPF, FEF, MAF, HAF, ISAF, SAF, FT and MT, and such carbon black may have been surface-treated with a silane coupling agent or the like. The loading of the reinforcing agent is preferably 1 to 300 parts by weight, more preferably 20 to 250 parts by weight, even more preferably 50 to 200 parts by weight, where the amount of the ethylene-α-olefin-nonconjugated polyene copolymer is taken as 100 parts by weight.

Examples of the foaming agent include inorganic foaming agents such as sodium bicarbonate, sodium carbonate, ammonium bicarbonate, ammonium carbonate and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azobiscyclohexylnitrile, azodiaminobenzene and barium azodicarboxylate; sulfonyl hydrazide compounds such as benzenesulfonyl hydrazide, tosyl hydrazide, p,p'-oxybis(benzenesulfonyl hydrazide) and diphenylsulfone-3,3'-disulfonyl hydrazide; and azide compounds such as calcium azide, 4,4'-diphenylsulfonyl azide and p-tosyl azide. The loading of the foaming agent is preferably 0.01 to 15 parts by weight, more preferably 0.05 to 8 parts by weight where the amount of the ethylene-α-olefin-nonconjugated polyene copolymer is taken as 100 parts by weight.

Examples of the foaming aid include organic acids such as salicylic acid, phthalic acid, stearic acid and oxalic acid; urea and its derivatives. The loading of the foaming aid is preferably 0.01 to 15 parts by weight, more preferably 0.05 to 8 parts by weight where the amount of the ethylene-α-olefin-nonconjugated polyene copolymer is taken as 100 parts by weight.

Examples of the stabilizer include amine antiaging agents, hindered phenol antiaging agents and sulfur-containing antiaging agents. The loading of the stabilizer is preferably 0.01 to 15 parts by weight, more preferably 0.05 to 8 parts by weight where the amount of the ethylene-α-olefin-nonconjugated polyene copolymer is taken as 100 parts by weight.

One example of the defoaming agent is calcium oxide. The loading of the defoaming agent is preferably 0.05 to 20 parts by weight, more preferably 0.1 to 8 parts by weight where the amount of the ethylene-α-olefin-nonconjugated polyene copolymer is taken as 100 parts by weight.

Examples of the resin include polyethylene-based resins, polypropylene-based resins, polybutene, poly-4-methyl-pentene-1, polystyrene, polyester, polyamide and polyphenylene ether. Examples of the polyethylene-based resins include high density polyethylene, medium density polyethylene, low density polyethylene and linear low density polyethylene.

As a method for preparing a polymer composition by incorporating additives and/or a resin to an ethylene-α-olefin-nonconjugated polyene copolymer, a publicly known method may be used. For example, a polymer composition can be prepared by kneading a softening agent, a reinforcing agent, a stabilizer, etc. with an ethylene-α-olefin-nonconjugated polyene copolymer at a temperature of 80 to 170° C. for 3 to 10 minutes by using an internal mixer such as a Banbury mixer, a kneader and an intermixer and then kneading the resultant at a temperature of 40 to 80° C. for 5 to 30 minutes by using a roll such as an open roll or a kneader, as necessary, with addition of a vulcanizing agent, a vulcanization accelerator, a vulcanization aid, a foaming agent, etc. When the kneading temperature in the internal mixer is lower than the decomposition temperature of the vulcanizing agent or the foaming agent, a softening agent, a reinforcing agent, a stabilizer, etc. and a vulcanizing agent, a foaming agent, etc. can also be kneaded at the same time.

In the method of vulcanizing the ethylene-α-olefin-nonconjugated polyene copolymer by heating, a heating sink having a heating means, such as hot air, a glass bead fluid bed, UHF (ultrahigh frequency electromagnetic wave), steam, and LCM (hot molten salt bath); a mold can be used. The heating temperature is preferably 150 to 270° C. and the heating time is preferably 1 to 60 minutes.

In the method of vulcanizing the ethylene-α-olefin-nonconjugated polyene copolymer by electron beam irradiation, the energy of electron beam is preferably 0.1 to 10 MeV, more preferably 0.3 to 2 MeV. It is preferred to irradiate the ethylene-α-olefin-nonconjugated polyene copolymer with electron beam so that the absorbed dose may be 0.5 to 35 Mrad, and it is more preferred to irradiate the ethylene-α-olefin-nonconjugated polyene copolymer with electron beam so that the absorbed dose may be 0.5 to 10 Mrad.

Vulcanized rubber is used suitably for a rubber hose. Examples of the rubber hose include a radiator hose, a heater hose, a brake hose and a brake reservoir hose.

Examples of the method for producing a rubber hose having a layer made of a vulcanized rubber include a method in which a polymer composition prepared by incorporating additives such as a softening agent, a reinforcing agent, a stabilizer, a vulcanizing agent, a vulcanization accelerator, and a vulcanization aid to an ethylene-α-olefin-nonconjugated polyene copolymer is molded into a molded article having a desired shape with a publicly known molding machine (e.g., an extrusion forming machine), and at the same time or after the molding, the molded article is heated to vulcanize and foam the molded article; and a method in which a polymer composition containing additives such as a foaming agent is molded into a molded article having a desired shape with the above-mentioned publicly known molding machine, and at the same time or after the molding, the molded article is heated to vulcanize the molded article or the molded article is irradiated with electron beam to vulcanize the molded article.

EXAMPLES

The present invention is described below with reference to examples.

[Method of Measurement/Valuation]

(1) the Amount of Ethylene Units and the Amount of Propylene Units

A copolymer was processed into a film having a thickness of about 0.1 mm with a hot-press machine, and the infrared absorption spectrum of this film was measured with an infrared spectrophotometer (IR-810 manufactured by Jasco Corporation). The ethylene unit content and the propylene unit content were determined from the infrared absorption spectrum in accordance with the method disclosed in a document ("Characterization of Polyethylene by Infrared Absorption Spectrum" written by Takayama, Usami, et al., and Die Makromolekulare Chemie, 177, 461 (1976), written by McRae, M. A., MadamS, W. F. et al.].

(2) Iodine Value

A copolymer was processed with a hot-press machine into a film having a thickness of about 0.5 mm. The intensity of a peak derived from 5-ethylidene-2-norbornene of the film (the absorption peak at 1688 $cm^{-1}$) was measured with an infrared spectrophotometer. A molar content of double bonds was determined from the peak intensity, and then an iodine value was calculated from the molar content.

(3) Mz/Mn and Mw/Mn

The Z-average molecular weight (Mz), the number average molecular weight (Mn) and the weight average molecular weight (Mw) of a copolymer were measured using gel permeation chromatography (GPC) under the following conditions (1) through (9), and then Mz/Mn and Mw/Mn were calculated.

(1) Apparatus: 150C manufactured by Waters
(2) Separatory column: Shodex Packed Column A-80M manufactured by Showa Denko K.K.
(3) Measurement temperature: 140° C.
(4) Carrier: ortho-dichlorobenzene
(5) Flow rate: 1.0 mL/min
(6) Sample concentration: about 1 mg/1 mL
(7) Injection amount: 400 L
(8) Detector: differential refraction
(9) Molecular weight standard substance: standard polystyrenes (4) Intrinsic Viscosity An intrinsic viscosity was measured in a tetralin solution at 135° C. by using an Ubbelohde viscometer.

(5) tan $\delta$ (100° C., 2 cpm)/tan $\delta$ (100° C., 1000 cpm)

Using a viscoelasticity measuring apparatus (RUBBER PROCESS ANALYZER RPA 2000P manufactured by ALPHA TECHNOLOGIES), tan $\delta$ of a copolymer [the ratio of a shear loss modulus to a shear storage modulus; (shear loss modulus)/(shear storage modulus)] at a temperature of 100° C. and a strain of 13.95% while varying frequency. The ratio of tan $\delta$ at a frequency of 2 cpm to tan $\delta$ at a frequency of 1000 cpm was calculated.

(6) Roll Kneading Processability of Polymer Composition

In step (2) of the preparation of a polymer composition in Examples and Comparative Examples, whether bagging was generated at the time of roll kneading was observed. The case where no bagging was generated was evaluated as "good", whereas the case where bagging was generated was evaluated as "bad."

(7) Extrusion Processability of Polymer Composition

To a 45 mm$\phi$ vent type extruder (manufactured by Nakata Engineering Co., Ltd.) with L/D=16 was mounted as an extrusion die a Garvey-type extrusion die regulated in 5.2 Die-ASTM Extrusion Die of ASTM D2230-90. Then a polymer component was extruded through the die at a screw temperature of 40° C., a cylinder temperature of 60° C., a die temperature of 80° C., and a screw speed of 60 rpm, and the extrusion rate (cm/min) of the polymer composition was measured. The higher the rate is, the better the extrusion processability is. The length (cm) of the thin polymer composition extruded per unit time (min) was defined to be an extrusion rate (cm/min).

Example 1

Preparation of Copolymer

The temperature of a stainless steel polymerization vessel equipped with a stirrer was kept at 60° C., and hexane, ethylene and propylene were fed to the polymerization vessel at rates of 0.461 kg/(hr·L), 31.6 g/(hr·L) and 169 g/(hr·L), respectively, per unit hour and unit capacity. VOCl$_3$, ethylaluminum sesquichloride (EASC) and hydrogen were fed to the polymerization vessel at rates of 230 mg/(hr·L), 341 mg/(hr·L) and 0.013 NL/(hr·L), respectively. Moreover, 5-ethylidene-2-norbornene was fed to the polymerization vessel at a rate of 2.8 g/(hr·L).

From the polymerization vessel was removed a polymerization solution so that the amount of the polymerization solution contained within the polymerization vessel might be held constant.

Solvent was removed from the removed polymerization solution, affording a copolymer (henceforth denoted by EPDM-A).

Analysis of EPDM-A revealed that EPDM-A had ethylene units amount/propylene units amount (molar ratio) of 0.61/0.39, an iodine value of 14.4 (g/100 g-polymer), Mz/Mn of 19.1, Mw/Mn of 4.2, an intrinsic viscosity of 1.60 dl/g, and tan $\delta$ (100° C., 2 cpm)/tan $\delta$ (100° C., 1000 cpm) of 1.40.

Preparation of Polymer Composition

Step (1)

With a Banbury mixer were kneaded 100 parts by weight EPDM-A, 5 parts by weight of zinc oxide, 1 part by weight of stearic acid, 90 parts by weight of FEF carbon black (ASAHI 60G produced by ASAHI CARBON Co., Ltd.), 5 parts by weight of paraffinic oil (Diana PW380 produced by Idemitsu Kosan Co., Ltd.), 2 parts by weight of polyethylene glycol (PEG4000), 2 parts by weight of a processing aid (Struktol WB212 produced by Schill+Seilacher), and 1 part by weight of 2-mercaptobenzimidazole (SUMILIZER MB produced by Sumitomo Chemical Co., Ltd.), affording a kneaded material. In the kneading, the temperature of the Banbury mixer at the beginning of the kneading was adjusted to 80° C., the rotor speed was adjusted to 60 rpm, and the kneading time was adjusted to 5 minutes.

Step (2)

The kneaded material, 5 parts by weight, per 100 parts by weight of EPDM-A in the kneaded material, of $\alpha,\alpha'$-bis(tert-butylperoxy)diisopropylbenzene (PEROXYMON F(40) produced by NOF Corporation; active component 60%) and 0.5 parts by weight of sulfur were kneaded with an open roll (manufactured by KANSAI ROLL Co., Ltd.), namely, a pair of 8-inch rolls having a roll temperature of 50° C., with a roll gap of 4 mm at rotation speeds of 15 rpm for the front roll and 18 rpm for the back roll while wrapping around the back roll. Thus, a polymer composition was obtained. Then, the roll kneading processability of the polymer composition was evaluated. Next, the extrusion processability of this polymer composition was evaluated. The result is shown in Table 1.

Example 2

Preparation of Copolymer

The temperature of a stainless steel polymerization vessel equipped with a stirrer was kept at 60° C., and hexane, ethylene and propylene were fed to the polymerization vessel at rates of 1.13 kg/(hr·L), 30.0 g/(hr·L) and 160 g/(hr·L), respectively, per unit hour and unit capacity. VOCl$_3$, ethylaluminum sesquichloride (EASC) and hydrogen were fed to the polymerization vessel at rates of 266 mg/(hr·L), 399 mg/(hr·L) and 0.001 NL/(hr·L), respectively. Moreover, 5-ethylidene-2-norbornene was fed to the polymerization vessel at a rate of 9.2 g/(hr·L).

From the polymerization vessel was removed a polymerization solution so that the amount of the polymerization solution contained within the polymerization vessel might be held constant. Solvent was removed from the removed polymerization solution, affording a copolymer (henceforth denoted by EPDM-B).

Analysis of EPDM-B revealed that EPDM-B had ethylene units amount/propylene units amount (molar ratio) of 0.62/0.38, an iodine value of 25.1 (g/100 g-polymer), Mz/Mn of 17.4, Mw/Mn of 4.0, an intrinsic viscosity of 1.41 dl/g, and tan $\delta$ (100° C., 2 cpm)/tan $\delta$ (100° C., 1000 cpm) of 1.51.

Preparation of Polymer Composition

A polymer composition was prepared in the same manner as "Preparation of Polymer Composition" of Example 1 except that EPDM-B was used instead of EPDM-A, and then the roll kneading processability and the extrusion processability of the polymer composition were evaluated. Evaluation results of the polymer composition are shown in Table 1.

Comparative Example 1

Preparation of Copolymer

To a stainless steel polymerization vessel equipped with a stirrer and having a temperature kept at 60° C. were fed hexane, ethylene and propylene at rates of 0.458 kg/(hr·L), 32.3 g/(hr·L) and 173 g/(hr·L), respectively, per unit hour and unit capacity. $VOCl_3$, ethylaluminum sesquichloride (EASC) and hydrogen were fed to the polymerization vessel at rates of 140 mg/(hr·L), 307 mg/(hr·L) and 0.010 NL/(hr·L), respectively. Moreover, 5-ethylidene-2-norbornene was fed to the polymerization vessel at a rate of 1.9 g/(hr·L).

From the polymerization vessel was removed a polymerization solution so that the amount of the polymerization solution contained within the polymerization vessel might be held constant.

Solvent was removed from the removed polymerization solution, affording a copolymer (henceforth denoted by EPDM-C).

Analysis of EPDM-C revealed that EPDM-C had ethylene units amount/propylene units amount (molar ratio) of 0.61/0.39, an iodine value of 9.6 (g/100 g-polymer), Mz/Mn of 13.4, Mw/Mn of 3.8, an intrinsic viscosity of 1.75 dl/g, and tan δ (100° C., 2 cpm)/tan δ (100° C., 1000 cpm) of 1.65.

Preparation of Polymer Composition

A polymer composition was prepared in the same manner as "Preparation of Polymer Composition" of Example 1 except that EPDM-C was used instead of EPDM-A, and then the roll kneading processability and the extrusion processability of the polymer composition were evaluated. Evaluation results of the polymer composition are shown in Table 1.

Comparative Example 2

Preparation of Copolymer

To a stainless steel polymerization vessel equipped with a stirrer and having a temperature kept at 55° C. were fed hexane, ethylene and propylene at rates of 0.458 kg/(hr·L), 32.4 g/(hr·L) and 173 g/(hr·L), respectively, per unit hour and unit capacity. $VOCl_3$, ethylaluminum sesquichloride (EASC) and hydrogen were fed to the polymerization vessel at rates of 108 mg/(hr·L), 237 mg/(hr·L) and 0.028 NL/(hr·L), respectively. Moreover, 5-ethylidene-2-norbornene was fed to the polymerization vessel at a rate of 1.9 g/(hr·L).

From the polymerization vessel was removed a polymerization solution so that the amount of the polymerization solution contained within the polymerization vessel might be held constant.

Solvent was removed from the removed polymerization solution, affording a copolymer (henceforth denoted by EPDM-D).

Analysis of EPDM-D revealed that EPDM-D had ethylene units amount/propylene units amount (molar ratio) of 0.61/0.39, an iodine value of 10.3 (g/100 g-polymer), Mz/Mn of 11.5, Mw/Mn of 3.2, an intrinsic viscosity of 1.65 dl/g, and tan δ (100° C., 2 cpm)/tan δ (100° C., 1000 cpm) of 1.96.

Preparation of Polymer Composition

A polymer composition was prepared in the same manner as "Preparation of Polymer Composition" of Example 1 except that EPDM-D was used instead of EPDM-A, and then the roll kneading processability and the extrusion processability of the polymer composition were evaluated. Evaluation results of the polymer composition are shown in Table 1.

Comparative Example 3

Preparation of Copolymer

To a stainless steel polymerization vessel equipped with a stirrer and having a temperature kept at 45° C. were fed hexane, ethylene and propylene at rates of 0.458 kg/(hr·L), 32.3 g/(hr·L) and 173 g/(hr·L), respectively, per unit hour and unit capacity. $VOCl_3$, ethylaluminum sesquichloride (EASC) and hydrogen were fed to the polymerization vessel at rates of 58.4 mg/(hr·L), 128 mg/(hr·L) and 0.076 NL/(hr·L), respectively. Moreover, dicyclopentadiene was fed to the polymerization vessel at a rate of 2.1 g/(hr·L).

From the polymerization vessel was removed a polymerization solution so that the amount of the polymerization solution contained within the polymerization vessel might be held constant.

Solvent was removed from the removed polymerization solution, affording a copolymer (henceforth denoted by EPDM-E).

Analysis of EPDM-E revealed that EPDM-E had ethylene units amount/propylene units amount (molar ratio) of 0.62/0.38, an iodine value of 9.5 (g/100 g-polymer), Mz/Mn of 10.6, Mw/Mn of 3.4, an intrinsic viscosity of 1.52 dl/g, and tan δ (100° C., 2 cpm)/tan δ (100° C., 1000 cpm) of 1.78.

Preparation of Polymer Composition

A polymer composition was prepared in the same manner as "Preparation of Polymer Composition" of Example 1 except that EPDM-E was used instead of EPDM-A, and then the roll kneading processability and the extrusion processability of the polymer composition were evaluated. Evaluation results of the polymer composition are shown in Table 1.

TABLE 1

| Evaluation | Example 1 | Example 2 | Comparative Example 1 | Comparative Example 2 | Comparative Example 3 |
|---|---|---|---|---|---|
| Kneading processability | Good | Good | Bad | Bad | Good |
| Extrusion processability (cm/min) | 584 | 607 | 575 | 560 | 544 |

INDUSTRIAL APPLICABILITY

According to the present invention, an ethylene-α-olefin-nonconjugated polyene copolymer excelling in roll kneading processability and extrusion processability can be provided.

The invention claimed is:

1. An ethylene-α-olefin-nonconjugated polyene copolymer comprising ethylene units, α-olefin units and nonconjugated polyene units, wherein the copolymer satisfies the following requirements (A), (B), (C), (D) and (E), (A): the intrinsic viscosity [η] is 0.5 to 1.8 dl/g, (B): the content of the ethylene units is 50 to 90 mol % and the content of the α-olefin units is 50 to 10 mol % where the sum total of the content of the ethylene units and the content of the α-olefin units is taken as 100 mol %, (C): the iodine value is 1 to 50, (D): the ratio of tan δ taken at 100° C. and 2 cpm to tan δ taken at 100° C. and 1000 cpm is from 1.0 to 1.7, (E): the ratio of the Z-average molecular weight to the number average molecular weight is from 15 to 25 and the weight average molecular weight to the number average molecular weight is from 3 to 5.

2. The ethylene-α-olefin-nonconjugated polyene copolymer according to claim 1, wherein the α-olefin is propylene, and the nonconjugated polyene is at least one compound selected from the compound group consisting of 5-alkylidene-2-norbornenes and 5-alkenyl-2-norbornenes.

* * * * *